United States Patent [19]

Fontana

[11] Patent Number: 4,644,624
[45] Date of Patent: Feb. 24, 1987

[54] METHOD FOR MANUFACTURING A FLANGED HALF BEARING

[75] Inventor: Mario Fontana, Cuorgnè, Italy

[73] Assignee: Federal-Mogul Corporation, Southfield, Mich.

[21] Appl. No.: 624,901

[22] Filed: Jun. 26, 1984

[30] Foreign Application Priority Data

Jul. 21, 1983 [IT] Italy ................ 67789 A/83

[51] Int. Cl.⁴ ............................................. B21D 53/10
[52] U.S. Cl. ........................ 29/149.5 R; 29/DIG. 24; 29/DIG. 48; 219/93; 384/274; 384/294; 384/429
[58] Field of Search ............... 29/149.5 C, 149.5 R, 29/148.4 R, 149.5 DP, DIG. 24, DIG. 48; 384/275, 294, 295, 296, 429; 219/92, 93

[56] References Cited

U.S. PATENT DOCUMENTS 1,759,906  5/1930  Kerruish ................ 29/149.5 R
3,469,063  9/1969  Dorn ............................ 219/93

FOREIGN PATENT DOCUMENTS 2528576  1/1976  Fed. Rep. of Germany ...... 384/296
2433929  2/1976  Fed. Rep. of Germany ...... 384/429
1168914  10/1969  United Kingdom .
1347047  2/1974  United Kingdom .
1386253  3/1975  United Kingdom .
1510124  5/1978  United Kingdom .
1512782  6/1978  United Kingdom .
1536780  12/1978  United Kingdom .
1589322  5/1981  United Kingdom .

OTHER PUBLICATIONS

"Projection Welding"; *Metals Handbook*, 8th Edition; vol. 6, Welding and Brazing (1971); pp. 434-455.

*Primary Examiner*—Howard N. Goldberg
*Assistant Examiner*—R. S. Wallace
*Attorney, Agent, or Firm*—Robert F. Hess; Lawrence J. Shurupoff

[57] ABSTRACT

A process for the manufacture of half bearings with flanges rigidly connected thereto, made of a steel plate with an antifriction layer, in which the plain (i.e. not yet flanged) half bearing and a pair of flanges are produced and worked separately, and subsequently the two flanges are fixed, in the correct position, onto the half bearing by a welding operation carried out by projection or by condenser discharge. The preparation and working of the thus separate components results in being very economical owing both to the reduction of the operational costs and to a considerable reduction of the cost of the necessary equipment, and the production times are remarkably reduced. The welding step requires very short times and, by the suitable choice of the process used for the welding operation, no deterioration of the antifriction layer applied to the support steel plate occurs, nor any deformation of the plate itself, so that no further working on the finished piece is required. This latter has a sturdiness adapted to the use of mechanized assembly means.

16 Claims, 6 Drawing Figures

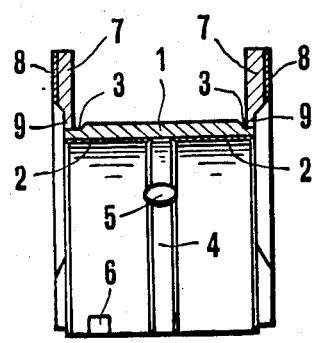
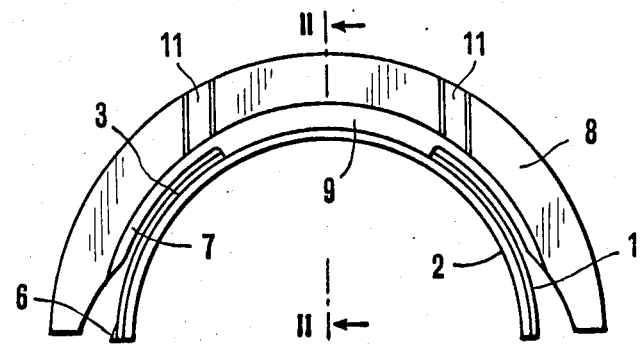
FIG. 2    FIG. 1
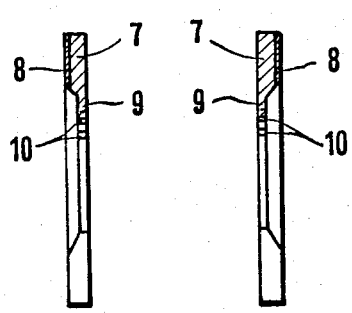
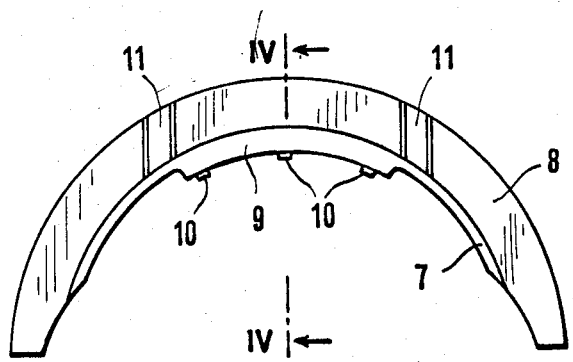
FIG. 4    FIG. 3
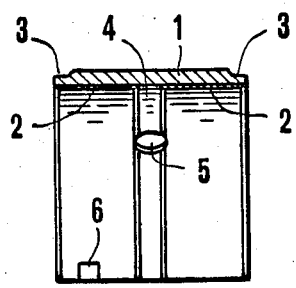
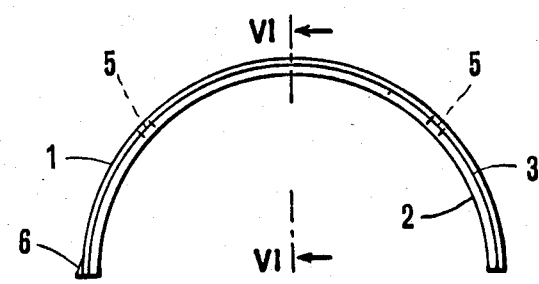
FIG. 6    FIG. 5

METHOD FOR MANUFACTURING A FLANGED HALF BEARING

BACKGROUND OF THE INVENTION

This invention relates to a process for the manufacture of half bearings with flanges rigidly connected thereto. The invention also relates to the bearings obtained by said process.

In various applications, and mainly for pivotally supporting the crankshafts of internal combustion engines, it is necessary to use radial bearings integrated by flanges acting as thrust bearings, and owing to assembly requirements the bearings must be subdivided in two parts. Half bearings and separate flanges may be used for each pivotal supporting point, but this method requires the separate installation of three components and therefore it gives rise to long working times and it is not suitable for mechanized assembly processes. Half bearings have been proposed, to which the respective flanges, in the form of half rings, are weakly secured by means of slightly fixed joints. These half bearings with flanges weakly secured thereto allow reducing the manual assembly times, but they are still not suitable for a mechanized assembly process, due to the insufficient resistance of the connection between the half rings and the half bearing. The mechanical grasping devices used in mechanized assembly operations cannot grasp the pieces with a human sensibility, and they often damage the pieces if these are not of a sufficient sturdiness.

To allow a mechanized assembly, half bearings with integral flanges are normally used, which are obtained from a steel sheet plaque coated, on one of its faces, with an antifriction material. However, the manufacture of such a complex piece from a plane coated plaque requires a long process of gradual bending with simultaneous bulging, which leads to very high production costs. In view of reducing these costs it has been proposed to separately manufacture the half bearing and the two half rings, and then to connect these three components by means of folded seamings. However, the seaming operations give rise to considerable deformations of the parts, so that both the half bearing with integral flanges and the half bearing with seamed flanges have to be subjected to the finishing operations when they already have assumed their complex final configuration; this implies the use of complex and expensive equipment, and long working times, and accordingly high production costs.

BRIEF SUMMARY OF THE INVENTION

The object of the present invention is to allow a rationalization of the manufacture of the half bearings with flanges rigidly connected thereto, and thereby a considerable reduction of the production costs, yet obtaining an article in which the connection between the half rings and the half bearing is sufficiently resistant to allow a mechanized handling thereof.

This object is attained, in accordance with the invention, by the fact that the manufacturing process consists in producing a half bearing having no flanges thereon, and separately producing a pair of thrust half rings; in carrying out on the separate components all the required working and finishing operations; and, finally, in rigidly connecting the half rings to a mutually half bearing, in the correct position, by a welding process carried out by projection or by condenser discharge.

Because the half bearings and the half rings are produced separately, equipment cost and the production cost of the parts are reduced. A similar reduction in cost is obtained in the machining and finishing operations of the components. These operations are carried out on pieces having a very simple configuration, require simple inexpensive equipment and result in short working times. Finally, welding by projection or by condenser discharge is carried out by inexpensive equipment, with high precision and very short working times, which times are in the order of a fraction of a second.

Because of the welding method chosen no deterioration of the antifriction material layer applied onto the support steel plate occurs, not any deformation of this latter, so that no further machining is required on the finished piece when it has achieved its final complex shape which would render expensive its machining.

The welding of the thrust half rings onto the half bearing by a welding process that is one of projection welding and welding by condenser discharge provides a connection whose sturdiness is certainly sufficient to allow any mechanical handling of the flanged half bearing during the assembly of an engine.

BRIEF DESCRIPTION OF THE DRAWING

These and other features and advantages of the subject of the invention will be more clearly apparent from the following description of an embodiment, given by way of a non limiting example, and diagrammatically shown in the annexed drawing, in which:

FIG. 1 is an axial view of a flanged half bearing manufactured according to the invention;

FIG. 2 is a sectional view thereof, taken along the line II—II of FIG. 1;

FIG. 3 is a view of a separate thrust flange;

FIG. 4 is a sectional view, taken along the line IV—IV of FIG. 3, of a pair of thrust flanges;

FIG. 5 is a view of the separate half bearing; and

FIG. 6 is a sectional view thereof, taken along the line VI—VI of FIG. 5.

DETAILED DESCRIPTION OF A PREFERRED EMBODIMENT

In accordance with the invention, in order to produce a flanged half bearing (FIGS. 1 and 2), the respective plain (i.e. not yet flanged) half bearing (FIGS. 5 and 6) and a pair of separate thrust flanges (FIGS. 3 and 4) are separately manufactured. The half bearing and the flanges, furthermore, are completely worked and finished still remaining separate, and hence produced in the most simple and economical way. The FIGS. from 3 to 6 show these separate components in their finished condition. The half bearing is formed by a steel plate 1 with an antifriction layer 2, bent by 180° and machined on a lathe to form two recessed outer circumferential seats 3 for mounting the flanges and, if needed, a central lubrication groove 4, into which radial holes 5 open. During this operation, also the antifriction layer 2 is finished exactly to a predetermined diameter. When required, a notch 6 may also be formed, which serves to ensure the correct orientation of the half bearing during the assembly operation.

Each thrust half ring is made of a steel plate 7 provided with an antifriction layer 8, which plate is plane, sheared to the desired semiannular configuration, and subjected to the machining operations required. Each half ring has, on the inner side, a central arcuate portion 9, whose inner radius is equal to that of the outer radius of half bearing seats 3, and this inner radius of the central portion 9 is intended to be welded to and abut the half bearing as shown in FIGS. 1 and 2. To this end, this central portion 9 has radial protrusions 10 intended to be used for carrying out the projection welding. The remaining two side portions of inner contour of the half ring, on the contrary, have a radius slightly larger than that of the central portion 9, and accordingly they will remain separated from the half ring, as shown in FIG. 1. The half ring may, finally, be machined (by material removal or by coining) for forming therein recessed lubrication grooves 11.

After having machined and finished in this way the separate components, two flanges and a half bearing are brought together in the correct mutual position, and a welding by projection or by condenser discharge is performed between the central portion 9 of the inner contour of the half rings and the seats 3 of the half bearing. FIGS. 3 and 4 show that before welding, the radial protrusions 10 will initially contact the mounting seat 3. FIGS. 1 and 2 show that after welding, the central portion 9 subsequently contacts the mounting seat. The welding can be carried out without any difficulty, since these parts have no antifriction coatings, and it ensures a sufficiently sturdy connection. The welding operation, owing to the appropriate choice of the welding process, does not deteriorate the antifriction layers, not even in the regions nearest the welding spots, nor does it give rise to any deformation of the components which could render necessary a further machining of these latter. Simple grasping implements retain the components exactly in the prefixed position during the welding operation, in a manner per se well known, so that by this process flanged half bearings are obtained, which are completely finished in compliance with the predetermined dimensions.

As it will be appreciated, by the use of this invention flanged half bearings can be manufactured, which have features equivalent to or even higher than those of the corresponding integral half bearings or of the half bearings composed by folded seaming, but with drastically reduced production costs. Taking into account the considerable cost reduction of the production equipment, the simplification of the working procedures, and the working time reduction, a reduction in the overall production cost of such half bearings may result. The reduction may be on the order of 50 percent.

I claim:

1. A process for the manufacture of half bearings with thrust flanges rigidly connected thereto, comprising the steps of:
    producing a plain half bearing having connection portions thereon;
    separately producing a pair of thrust half rings having an inner contour provided with a plurality of protrusions for connection to said plain half bearing;
    carrying out on said plain half bearing and said pair of thrust half rings all required working and finishing operations;
    mounting said pair of thrust half rings on said plain half bearing with said protrusions of said inner contour of said pair of thrust half rings registering with and contacting said connection portions of said plain half bearing; and
    rigidly connecting said pair of thrust half rings to said half bearing by a projection welding process wherein said inner contour subsequently abuts said connection portions.

2. A process as set forth in claim 1, wherein said inner contour of said half rings comprises a central portion having an inner radius which corresponds to an outer radius of said connection portions of said half bearing, said inner contour having two side portions located at both sides of said central portion, and said side portions having a radius larger than that of said central portion.

3. A process as set forth in claim 1, wherein said connection portions of said half bearing comprise recessed connection seats.

4. A process as set forth in claim 1, wherein said half bearing and said half rings each comprises a steel plate, each said steel plate being coated on one of its faces with an antifriction layer.

5. A process for the manufacture of half bearings with thrust flanges rigidly connected thereto, comprising the steps of:
    producing a plain half bearing having connection portions thereon;
    separately producing a pair of thrust half rings having an inner contour provided with a plurality of protrusions for connection to said plain half bearing;
    carrying out on said plain half bearing and said pair of thrust half rings all required working and finishing operations;
    mounting said pair of thrust half rings on said plain half bearing with said protrusions of said inner contour of said pair of thrust half rings registering with and contacting said connection portions of said plain half bearings; and
    rigidly connecting said pair of thrust half rings to said half bearing by a condenser discharge welding process wherein said inner contour subsequently abuts said connection portions.

6. A process as set forth in claim 5, wherein said inner contour of said half rings comprises a central portion having an inner radius which corresponds to an outer radius of said connection portions of said half bearing, said inner contour having two side portions located at both sides of said central portion, and said side portions having a radius larger than that of said central portion.

7. A process as set forth in claim 5, wherein said connection portions of said half bearing comprise recessed connection seats.

8. A process as set forth in claim 5, wherein said half bearing and said half rings each comprises a steel plate, each said steel plate being coated on one of its faces with an antifriction layer.

9. A process for the manufacture of half bearings with at least one thrust flange rigidly connected thereto, comprising the steps of:
    producing a plain half bearing having connection portions thereon;
    separately producing at least one thrust half ring having an inner contour provided with a plurality of protrusions for connection to said plain half bearing;
    carrying out on said plain half bearing and said at least one thrust half ring all required working and finishing operations;
    mounting said at least one half ring on said plain half bearing with said protrusions of said inner contour of said at least one thrust half ring registering with and contacting said connection portions of said plain half bearing; and
    rigidly connecting said at least one thrust half ring to said half bearing by a projection welding process wherein said inner contour subsequently abuts said connection portions.

10. A process as set forth in claim 9, wherein said inner contour of said at least one half ring comprises a central portion having an inner radius which corresponds to an outer radius of said connection portions of said half bearing, said inner contour having two side portions located at both sides of said central portion, and said side portions having a radius larger than that of said central portion.

11. A process as set forth in claim 9, wherein said connection portions of said half bearing comprise recessed connection seats.

12. A process as set forth in claim 9, wherein said half bearing and said half ring each comprises a steel plate, each said steel plate being coated on one of its faces with an antifriction layer.

13. A process for the manufacture of half bearings with at least one thrust flange rigidly connected thereto, comprising the steps of:

producing a plain half bearing having connection portions thereon;

separately producing at least one thrust half ring having an inner contour provided with a plurality of protrusions for connection to said plain half bearing;

carrying out on said plain half bearing and said at least one thrust half ring all required working and finishing operations;

mounting said at least one half ring on said plain half bearing with said protrusions of said inner contour of said at least one thrust half ring registering with and contacting said connection portions of said plain half bearing; and rigidly connecting said at least one thrust half ring to said half bearing by a condenser discharge welding process wherein said inner contour subsequently abuts said connection portions.

14. A process as set forth in claim 13, wherein said inner contour of said at least one half ring comprises a central portion having an inner radius which corresponds to an outer radius of said connection portions of said half bearing, said inner contour having two side portions located at both sides of said central portion, and said side portions having a radius larger than that of said central portion.

15. A process as set forth in claim 13, wherein said connection portions of said half bearing comprise recessed connection seats.

16. A process as set forth in claim 13, wherein said half bearing and said half ring each comprises a steel plate, each said steel plate being coated on one of its faces with an antifriction layer.

* * * * *